United States Patent

Keig et al.

[15] 3,655,415
[45] Apr. 11, 1972

[54] ASTERIATED SYNTHETIC CORUNDUM GEM STONES AND METHOD AND APPARATUS FOR THEIR PRODUCTION

[72] Inventors: George A. Keig, El Cajon, Calif.; James C. Smith, Indianapolis, Ind.; John M. J. Watts, Poway, Calif.

[73] Assignee: Union Carbide Corporation, New York, N.Y.

[22] Filed: Dec. 31, 1968

[21] Appl. No.: 788,255

[52] U.S. Cl. ............................ 106/42, 23/301 SP, 23/141, 23/273 SP, 23/305
[51] Int. Cl. ................... B01j 17/18, C01f 7/02, C04b 35/00
[58] Field of Search ............... 23/301, 300, 305, 141; 106/42

[56] References Cited

UNITED STATES PATENTS

| | | |
|---|---|---|
| 2,427,454 | 9/1947 | Heany .................................... 106/42 |
| 2,488,507 | 11/1949 | Burdick et al. ......................... 106/42 |
| 2,715,071 | 8/1955 | Merker .................................... 106/42 |
| 2,852,890 | 9/1958 | Drost et al. ............................. 23/301 |
| 3,086,850 | 4/1963 | Marino et al. .......................... 23/273 |
| 3,234,051 | 2/1966 | Kiffer et al. ............................ 23/273 |
| 3,527,574 | 9/1970 | La Belle .................................. 23/301 |

Primary Examiner—Norman Yudkoff
Assistant Examiner—R. T. Foster
Attorney—Paul A. Rose, Thomas I. O'Brien, Harrie M. Humphreys and Leo A. Plum

[57] ABSTRACT

Asteriated synthetic corundum gem stones are provided which have their asteriating compounds as well as coloring compounds uniformly distributed throughout the body and which are free of the heavy banding characterizing previously made synthetic asteriated corundum gem stones. Method and apparatus for the production of these gem stones is also provided.

7 Claims, 6 Drawing Figures

ASTERIATED SYNTHETIC CORUNDUM GEM STONES AND METHOD AND APPARATUS FOR THEIR PRODUCTION

This invention relates to novel synthetic asteriated corundum gem stones, for example, synthetic star sapphires, rubies and other colored asteriated corundum crystals, and to a process and apparatus for their production.

U.S. Pat. No. 2,488,507 discloses the method for producing asterism in synthetic corundum crystals. According to that patent, when a synthetic ruby or sapphire boule is grown by the Verneuil process from an alumina powder containing from about 0.1 to 0.3 percent of titania, and then is heated at a temperature between 1,100° C. and 1,500° C., a titanium compound, believed to be titania, precipitates out of solid solution as a cloudy silky precipitate. Synthetic star sapphires and rubies are cut en cabochon from the boule, i.e., with a convex surface opposite a plane surface, and the the C-axis of the crystal normal to the base and extending vertically through the center of the convex crown. Such stones exhibit a six-rayed star centered in the crown of the stone. These synthetic star sapphires and rubies are distinguished from natural star sapphires and rubies in that the synthetic crystals have curved growth lines due to the formation of a convex-shaped crystal growth interface during the Verneuil process whereas natural crystals have generally planar growth lines.

An improved crystal growing process is disclosed in U.S. Pat. No. 2,690,062 whereby a tendency for the titania to concentrate in a narrow peripheral zone around the boule during normal Verneuil growth is relieved. According to that patent, synthetic corundum crystals are grown by passing powdered constituents of the crystal comprising powdered alumina containing between about 0.1 and 0.3 percent by weight titania and other coloring agents as desired, through a flame to fuse the constituents and then accumulating and crystallizing the fused constituents on a seed crystal, while maintaining fluctuating thermal conditions around the growing crystal whereby the crystal grows as a series of thin convex transverse layers distributed along the length of the boule, alternate ones of said layers having titania distributed in solid solution therein across the full width thereof and the intermediate layers having titania concentrated adjacent the periphery thereof, but being substantially free from titania adjacent the center thereof.

When a synthetic corundum crystal boule is grown as described above, and, as is preferred, with a C-axis orientation of about zero degrees with respect to the longitudinal growth axis of the boule, a gem stone can be cut in cabochon from the asteriated boule in such a way that the convex crown of the cabochon has the same curvature as the curved layers in the boule which have titania distributed across the full width thereof. The so-cut cabochon thus appears to have a uniform and homogeneous color across the crown and the six rays of the star extend equally down the sides of the gem stone to its base.

It has been found, however, that serious problems arise in regard to the fabricated of gem stones from such layered boules. For example, if the boule is grown by the Verneuil process with thermal fluctuations to produce the desired layering, but with a C-axis orientation of other than zero degrees, for example, with a C-axis orientation of 90°, then the cabochon cut from such a boule will have a crown whose curvature will intersect the layers of alternating titania content and will have a less attractive visible banded appearance. It is generally necessary, therefore, to grow such Verneuil boules at a C-axis orientation close to zero degrees, a requirement entailing the need for close control of the process.

Additionally, since the convex layers having titania distributed therein arc transversely across the full width of the boule and since the crown of the gem stone must follow the curve of the titania-rich layer, it is generally only possible to cut one cabochon from each blank, or disc-shaped section of a boule produced by making two spaced-apart cuts normal to the boule axis. These blanks must be cut so that the gem stone to be produced therefrom has the proper proportions, i.e., a base width about twice the height of the cabochon, meaning that the normally tapered Verneuil boule must be cut into a series of blanks of varying heights for conversion into cabochon gem stones of varying size. The need for such proportioning of each Verneuil boule and the limitations on the availability of certain cabochon sizes due to the dimensions and internal structure of the Verneuil boule are costly and wasteful.

It is an object of this invention, therefore, to provide a synthetic corundum crystalline body having its asteriating compound, as well as any coloring agents present therein, substantially uniformly distributed throughout the crystal body, whereby cabochons can be produced from any section of the crystal body and in any desired size compatible with the need to have the base plane of the cabochon normal to the C-axis orientation of the crystal, and wherein a fully developed star effect can be produced.

It is also an object of this invention to produce a synthetic corundum crystalline boule having a homogeneous color and a substantially uniform distribution of asteriating compound throughout the boule and which is free of the convex transverse layers of varying titania content as found in the previously described Verneuil boules.

It is also an object of this invention to provide synthetic asteriating corundum gem stone cabochons, having homogeneous color and substantially uniform distribution of the asteriating precipitate whereby each stone exhibits a well-defined six-rayed star, all legs of which extend equally down the sides of the stone to its base, and which cabochon is free of the banding characterizing the gem stones cut from a layered boule.

It is also an object of this invention to provide a process for producing a synthetic corundum crystal body having an asteriating compound, as well as any coloring agents present therein, substantially uniformly distributed throughout the crystal body, said crystal being free of the convex transverse layers of varying titania content present in the previously described cabochons cut from Verneuil grown boules.

It is another object of this invention to provide an improved apparatus for accomplishing these results.

Other aims and advantages of this invention will be apparent from the following description, the attached drawings and the appended claims.

According to the above objects, a process is provided for producing a synthetic corundum crystal wherein a titanium asteriating compound is uniformly distributed throughout the crystal, comprising establishing a melt composed of alumina and titania, the titania being present in an amount from about 1 to about 3 percent by weight of said melt, establishing a region on the surface of said melt at a temperature suitable for crystal growth, dipping a seed crystal into the melt, and pulling the seed crystal from the melt as crystal growth occurs thereon. A crystal body pulled as described above from a melt comprising alumina and titania with the titania present in an amount, for example, of 1.5 percent by weight of the melt, will itself have about 0.15 percent of weight titan in solid solution uniformly distributed throughout the crystal body. This crystal body can be asteriated homogeneously throughout the mass of the body by heat treating at a temperature between 1,100° C. and 1,500° C. for a time sufficient to develop asterism. A gem stone is then cut en cabochon from the crystal body with its base plane normal to the C-axis orientation of the crystal body. The gem stone will be observed to have a symmetrical six-rayed star with each leg extending equally down the sides of the cabochon to its base, and yet the cabochon will be free of any appearance of banding regardless of how it was cut from the crystal body. Additionally, colored synthetic asteriated gem stones, for example, asteriated blue sapphires and rubies, may be produced by adding to the melt of alumina and titania an amount of a compound supplying ions of elements which have the ability to enter the alumina lattice in solid solution and produce selected absorption of light in the visible spectrum, thus giving a color to the crystal. Such colored crystals will have a homogeneous color due to a uniform distribution of the coloring ions, even in regard to those colored corundum crystals, for example blue sapphires, which cannot be obtained by the Verneuil technique unless a layered structure is produced.

In a preferred practice of the invention a process is provided for pulling a synthetic corundum crystal from a melt of the crystal constituent materials wherein asteriation-producing titania solute in an amount from about 0.1 to about 0.3 percent by weight is uniformly distributed throughout the pulled crystal, said process comprising establishing and maintaining by the addition of heat thereto a melt composed of alumina and titania the titania solute being present in said melt in an amount from about 1 to about 3 percent by weight of the melt and having a low equilibrium distribution coefficient of 0.1 in regard to said melt and any crystal grown therefrom thereby causing a rejection of said titania solute from the growing crystal with a resultant increase in concentration of titania solute in a layer of the melt adjacent the crystal interface, said excess titania concentration being transportable through the layer adjacent said interface and into the melt proper only by a time dependent diffusion mechanism and thereby dictating a maximum pulling rate for withdrawing the crystal from the melt without the incorporation into the growing crystal of portions of melt containing excess concentrations of titania solute, dipping a seed crystal into a localized region of the surface of said melt and initiating crystal growth thereon, and withdrawing said growing crystal from the melt at a pulling rate in excess of the maximum pulling rate dictated by the excess titania concentration at the growth interface, and preventing the incorporation into the growing crystal of excess solute containing portions of the melt by maintaining the localized region at a temperature supporting crystal growth while restricting the loss of heat by radiation from regions of the melt surrounding the localized region to maintain a higher temperature gradient through the diffusion layer into the melt proper than the temperature gradient which would normally occur if such loss of heat from the surrounding regions were not restricted, whereby portions of the liquid containing excess solute are not trapped and solidified in the growing crystal because of the higher temperature across the diffusion layer.

More specifically, a process is provided for producing a synthetic corundum crystal wherein a titanium asteriating compound is uniformly distributed throughout the crystal, comprising establish-ing a melt composed of alumina and titania, the titania being present in an amount from 1 to about 1 percent by weight of said melt, establishing a localized region on the surface of said melt at a temperature suitable for crystal growth while maintaining regions immediately surrounding said localized region at a temperature not supporting crystal growth by heating said melt while allowing unrestricted upward radiation of thermal energy from the localized region while restricting the loss of heat by radiation from the surrounding regions, dipping a seed crystal into the melt in the localized region, and pulling the seed crystal vertically from the melt as crystal growth occurs thereon forming a cone-shaped crystal body of gradually increasing diameter, and containing the withdrawal of heat from said localized region mainly by substantially unrestricted radiation from said region and to a lesser extent by conduction and radiation upward through the cone-shaped crystal body until the diameter of the body reaches a desired diameter and, thereafter, continuing to pull the crystal body of desired diameter from the melt while withdrawing heat from the localized region mainly by conduction and radiation through the crystal body.

An apparatus suitable for the accomplishment of this process is provided comprising a crucible having a circular cross section, said crucible surrounded on its sides by at least one cylindrical insulating member, an induction heating coil having a circular cross section and being symmetrically arranged around the insulating member and crucible for inducing a heating current in said crucible, a lid over the crucible opening, said lid having a centrally located circular opening, said lid opening being slightly greater in diameter than the maximum diameter of the crystal to be pulled, to allow withdrawal of the crystal from a melt contained in the crucible and to allow unrestricted upward radiation of thermal energy from a localized central portion of the surface of a melt contained in said crucible during initial phases of the crystal pulling operation, and an insulating member arranged transversely above the lid of the crucible, said insulating member having a centrally located circular opening of a diameter greater than the diameter of the opening in the lid and defining with the lid a heat conserving and afterheater zone, the edges of said crucible lid opening and the edges of the opening in the overlying insulating member forming inverted right cone angles with a common apex point located in the crucible on its vertical axis, the solid angle of the cone formed by the apex point and the lid opening being an angle from 100° to 140°, and the solid angle of the cone formed by the apex point and the insulating member opening being an angle from 45° to 65°, whereby when a melt is contained in said crucible with its surface at the level of the apex point, the localized region therearound may radiate thermal energy upwardly through said cone-shaped zone having a solid angle of from 100° to 140° while the unrestricted radiation of thermal radiation from regions of said melt surface surrounding said localized region will be restricted to a lesser angle, and whereby only the portion of said thermal energy radiating through the cone-shaped zone having a solid angle of from 45° to 65° will escape through the opening in the insulating member, with the remainder of said radiation being conserved in the region between the lid and the insulating member.

Figure 1:
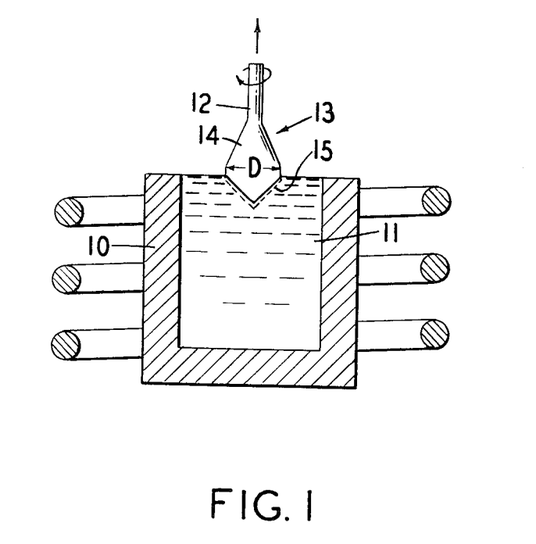
FIG. 1 is a schematic representation of a crystal pulling operation.

Referring to FIG. 1, there is shown schematically a typical melt pulling operation comprising a crucible 10 holding a melt 11 of crystal constituent material. A seed crystal 12 had been earlier inserted in the melt and withdrawn as crystal growth occurred thereon producing the now partially formed monocrystalline body 13. The seed rod and growing crystal are generally rotated while being pulled to form a crystal body of circular cross section. Otherwise the crystal body would assume a polygonal shape due to the tendency of the growing crystal to develop equilibrium crystal faces of the lowest surface free energy. The upwardly oriented cone-shaped section 14 of this body was formed during the critical phase of the crystal growing operation wherein the crystal was allowed to build up upon itself, gradually increasing in diameter, until the crystal body attains a desired diameter "D." The crystal body is further pulled from the melt forming an elongated boule of more or less constant diameter "D" and a desired length.

In the crystal growing process of this invention, the composition of the melt from which the crystal is pulled comprises alumina ($Al_2O_3$) and titania ($TiO_2$) in an amount by weight from about 1 to about 3 percent, as well as amounts of compounds for producing a desired color in the crystal. Thus, if a blue star sapphire is to be produced, it is necessary to have in the melt, in addition to the titania, an amount by weight of ferric oxide ($Fe_2O_3$) between about 0.9 and about 1.5 percent. For example, if the melt contained 1 percent by weight titania, 1.5 percent by weight ferric oxide and the balance alumina, the alumina or corundum crystal pulled therefrom would contain about 0.1 percent by weight titania and about 0.05 percent by weight ferric oxide. The blue color of the star stone is believed to be due to the substitution of $Ti^{+4}$ and $Fe^{+2}$ ions for $Al^{3+}$ ion in the corundum lattice and the asteriation due to the precipitation, after heat treatment, of a needle-like titanium compound, believed to be a complex aluminum titanate. The presence of good color in the crystal requires the presence therein of sufficient dopants in the correct valence state; and the attainment of full asteriation requires the presence in the crystal of sufficient titanium in the correct valence state. For a blue star sapphire the requirements as to the needed amounts of titanium and iron are generally satisfied by the presence in the crystal body of these elements in amounts, when analyzed as weight content in the crystal of titania and ferric oxide, of between about 0.1 and 0.3 percent titania between about 0.03 and 0.05 percent ferric oxide. It has been found that in order to attain measured titania contents of between about 0.1 and about 0.3 percent by weight in the crystal body, it is necessary to have put approximately ten times this desired concentration in the melt, i.e., between about 1 and 3 percent by weight. This is due to an effective distribution coefficient, i.e., the ratio of the concentration of solute in the crystal to the concentration of solute in the melt, of approximately 0.1 for the $TiO_2-Al_2O_3$ system. The effective distribution coefficient for ferric oxide in alumina was similarly found to be approximately 0.1 (larger amounts of ferric oxide, i.e., between about 0.9 and about 1.5 percent by weight, must be added to the melt because of the loss by evaporation from the melt of about two-thirds of the ferric oxide added). Severe problems in crystal growth occur because of the low distribution coefficients of these solutes, and in particular with regard to the incorporation of sufficient amounts of titania in the crystal. Crystals of selected colors, other than blue, can be produced using coloring compounds having effective distribution coefficients near unity, for example, the use of chromic oxide to produce red corundum or ruby; but the production of asterism in any of these corundum crystals requires the incorporation of titania in the amounts specified.

A distribution coefficient less than unity implies a rejection of the solute by the crystal at the growth interface, with the result that an increased concentration of this solute is built up in the liquid, specifically in a narrow zone adjacent the solidus-liquidus interface. Referring to FIG. 1, this zone is designated the diffusion layer 15 since the velocity of the liquid there is zero, even in a stirred melt, and since the principle means of transport of the excess solute through this layer to the bulk of the melt is by diffusion, a time dependent reaction. If the growing crystal 14 incorporates portions of the melt-containing a solute concentration in excess of that in the crystal and which subsequently solidifies, inclusions are formed in the crystal which have a different composition and refractive properties from the bulk of the crystal. Crystal growth in the melt pulling process depends on removal of heat by conduction and radiation upwards through the growing crystal and any changes in this heat transfer process due to inclusions and discontinuities in the crystal interferes with the proper growth of the crystal. This is a particular problem in regard to the initial phase of the boule pulling process when the crystal body 14 is being brought out to its maximum diameter "D." Unless this initial portion 14 of the crystal body is pulled in a high state of perfection, it is extremely difficult to produce a boule of high optical perfection, uniform dopant concentration and straightness.

Figure 2:
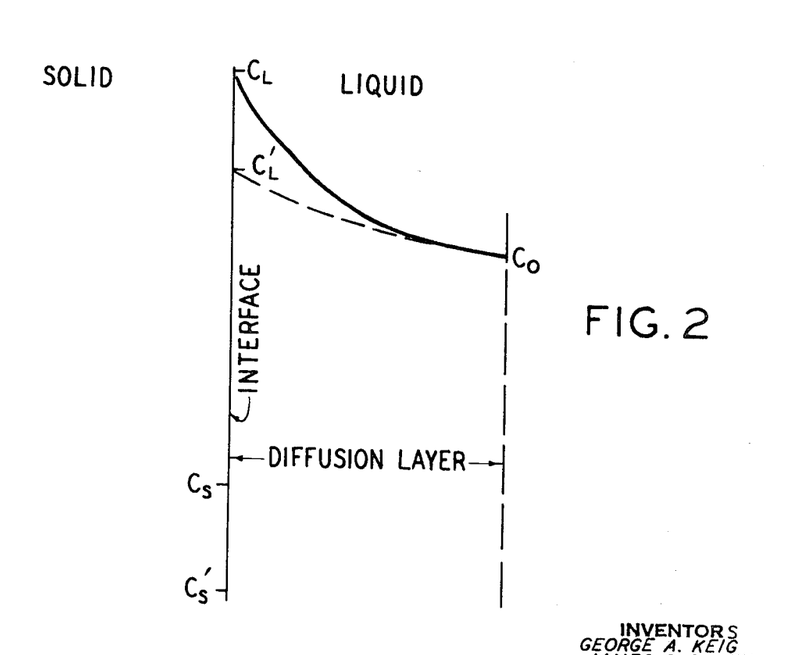
FIG. 2 is a graphical representation of the concentration of the solute in the molten liquid at a given distance away from the crystal growth interface for two different growth rates.
Figure 3:
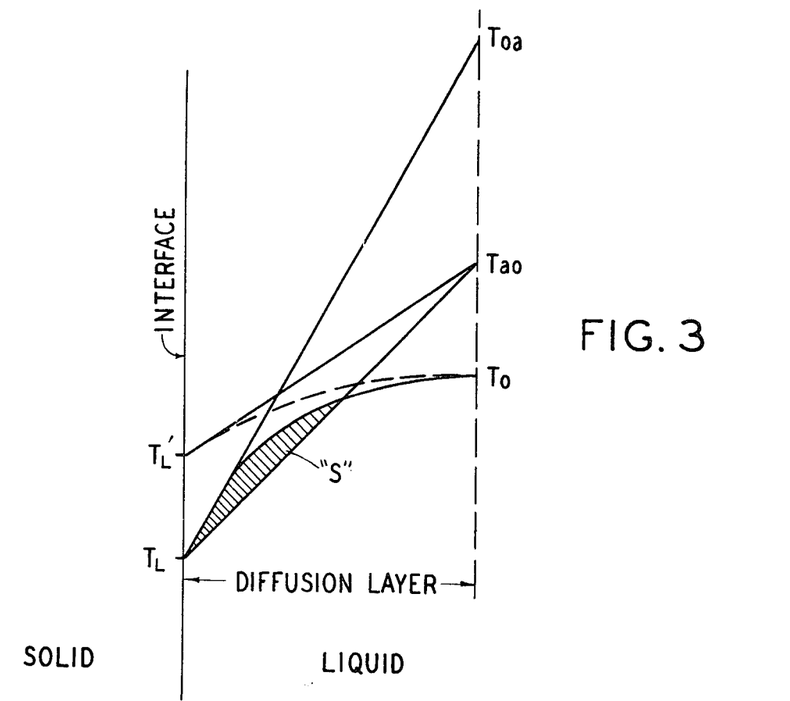
FIG. 3 is a graphical representation of the liquidus temperature corresponding to the solute concentrations shown in FIG. 2 for the two growth rate conditions as well as the actual thermal gradients existing in the melt under such conditions.

Since the excess solute in the diffusion layer will diffuse with time across this layer into the bulk of the melt, it is sometimes possible to prevent the incorporation of these secondary phases into the crystal by reducing the growth rate, i.e., by lowering the pulling rate. FIG. 2 represents the concentration of solute in the liquid at a given distance away from the growth interface for two different pulling rates, R and R', wherein R' is lower than R. $C_o$ represents the average concentration of solute, i.e., titania, outside the diffusion layer in the melt proper where the solute concentration is substantially uniform due to convection stirring of the melt. $C_L$ and $C_L'$ represent the concentration of solute in the diffusion layer at the growth interface for the two growth rates, R and R' respectively. $C_s$ and $C_s'$ represent the concentration of solute in the solidified crystal for the two growth rates R and R'. The equilibrium distribution constant, Ko is defined as follows:

$$Ko = C_s/C_L$$

and is fixed by the titanium oxide-aluminum oxide phase diagram but is not necessarily a constant. The effective distribution constant, Ke is defined as follows:

$$Ke = C_s/C_o$$

and is dependent on the conditions under which solidification takes place. FIG. 3 shows the equilibrium liquidus temperature curves for the two solute concentrations $C_s$ and $C_s'$. Curve $T_o-T_L$ represents the liquidus line corresponding to the solute concentration $C_s$ resulting from use of the faster pulling rate R; and curve $T_o-T_L'$ represents the liquidus line corresponding to the lower solute concentration $C_s'$ resulting from the use of the slower pulling rate R'. The actual temperature gradients in the liquid away from the interface are also shown as lines $T_L-T_{ao}$ for the faster pulling rate R, and line $T_L'-T_{ao}$ for the slower pulling rate R' (the temperature gradient lines are assumed here to be linear). The shaded area "S" under the liquidus curve for the faster pulling rate R represents a region where constitutional supercooling can occur at the faster pulling rate whereby any instability or bump which arises on the growing crystal interface is propagated further whereas the adjacent liquid region increases in solute concentration and remains as a liquid which is eventually trapped inside the solid single crystal and solidifies therein when the concentration has become high enough and the temperature low enough to form a second phase. When complete solidification occurs, a void is formed because of the volume difference between the liquid and the solid. Such voids or discontinuities interfere with heat flow up through the crystal upsetting the equilibrium conditions needed for high quality crystal growth. Additionally, these voids show up at the surface of polished crystals as pits and reduce the value of the crystals. This constitutional supercooling problem can sometimes be avoided by reducing the pulling rate to a lower value, such as R', whereby the solute concentration at the interface, $C_s'$, is lowered and the temperature gradient $TL'-T_{ao}$ is raised above the liquidus curve for that solute concentration whereby constitutional supercooling cannot ordinarily occur. However, it is not always desirable to lower the crystal pulling rate for economic reasons and also because it is preferred to pull the crystal from the melt at as high a rate as is practical in order to complete the job in a short period of time during which growing conditions and the environment can be kept reasonably uniform. Additionally, because of the low effective distribution coefficient of the titania-alumina system and because of the large amount of titania needed to be incorporated in the crystal to produce asteriation, the pulling rate needed to accomplish the desired result could be extremely low and difficult to regulate in the case of the higher titania contents.

It is the preferred practice of this invention therefore to operate the crystal pulling process at the higher pulling rate R whereby increased concentration of solute $C_s$ occurs at the interface and whereby constitutional supercooling could take place, but to modify the system to increase the temperature gradient in the liquid away from the interface whereby constitutional supercooling cannot occur. This increased temperature gradient is represented in FIG. 3 by the line $T_L-T_{ao}$. The effect of operating along the temperature gradient $T_L-T_{oa}$ is that any instability or bump which might arise on the growing crystal interface, due to unavoidable minor fluctuations in growing conditions, will not extend deeply into the region S where constitutional supercooling can occur, but will be terminated and eventually remelted because of the now higher temperature conditions in the diffusion layer. A seed crystal can be inserted in a melt maintained under these conditions and withdrawn at a pulling rate faster than the solute concentration conditions of the melt would normally allow and yet there will be a lessened danger of constitutional supercooling or the occurrence of second phase inclusions, voids or discontinuities in the growing crystal. This freedom This the formation of second phase inclusions, voids or discontinuities is particularly beneficial in the initial phase of the growing process since the seed crystal can be rapidly pulled from the melt allowing the crystal body to build up upon itself in a high order to perfection. When the remainder of the boule is grown from this initial conical section, it will be of the same high degree of perfection and will be of the same uniform solute concentration, high optical quality and straightness needed to produce a fully grown boule of the highest quality. Additionally, by the use of the process of this invention it is possible to withdraw the crystals at rates of 0.508 cm per hour (one-fifth inches per hour) whereas without the use of the process described here it would have been necessary to use pulling rates of 0.318 cm per hour (one-eighth inches per hour) or lower, depending on the solute content of the melt.

Figure 4:
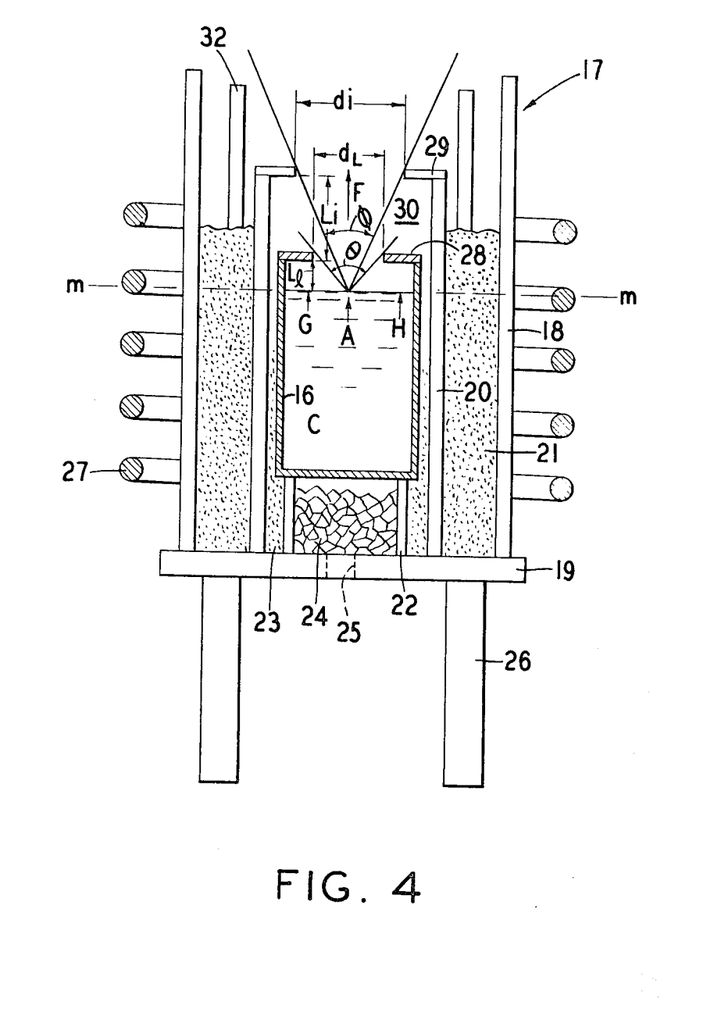
FIG. 4 is an elevational view, partly in section and not necessarily to scale, of the apparatus for carrying out the process of this invention and for producing the synthetic corundum crystalline boule of this invention having homogeneous color and uniform distribution of asteriating compound.

Referring now to FIG. 4 there is shown apparatus suitable for practicing this process, including a crucible 16 of circular cross section. The crucible should be constructed of a refractory metal having a melting point higher than that of the alumina-titania melt (about 2,040° C.). It should also be substantially inert to the molten alumina. Tungsten and iridium are examples of suitable crucible materials.

The crucible 16 is fitted inside a cylindrical structure 17 composed of insulating materials, for example materials such as alumina, silica, zirconia, etc. An example of a suitable insulation structure comprises an outer cylindrical sleeve 18, resting on platform 19. An inner cylindrical sleeve 20, surrounds the crucible, and rests on the platform 19. Granulated refractory material 21, is packed into the space between the inner and outer sleeves. Another smaller cylindrical sleeve 22, of a diameter smaller than that of the crucible rests on the platform 19 and supports the crucible 16 in a position above the platform 19. A granular insulating material 23 is packed into the annular space between this smaller sleeve 22 and the inner sleeve; and a refractory material of a larger size, for example chip 24 of refractory material, are loosely arranged inside the smaller sleeve 22 and over the platform 19. A smaller diameter opening 25 exists in the center of the platform slab 19 which itself rests on a cylindrical support member 26.

An r-f heating coil 27 is placed around the cylindrical insulating structure. A flow of electrical current through the coil induces a flow of current in the crucible-susceptor 16 thereby heating the crucible to a high temperature. Heat is transferred by conduction from the walls of the crucible to the charge of crystal constituent materials in the crucible to form and maintain the melt.

An annular lid 28 is placed over the mouth of the crucible. This lid has a central circular opening of a diameter "$d_L$" which is greater than the maximum diameter of the crystal boule to be pulled from the melt.

An annular insulating member 29 is positioned a distance "$L_i$" over the crucible lid 28, for example by being supported by the inner cylindrical sleeve 20. The space 30 formed by the insulating member 29, lid 28 and cylindrical insulating member 20 is a heat conserving an afterheater zone as explained hereinafter. This insulating member 29 has a central opening "$d_i$", concentric with and larger in diameter than the diameter of the lid opening. The insulating member is arranged so as to form a cone-shaped zone of unrestricted access to the center point on the melt surface defining a solid angle $\phi$ of from about 45° to 65°. As shown in FIG. 4, this angle $\phi$ is determined by the following factors: the diameter of the insulating member opening "$d_i$"; and the distance between the melt surface and the insulating member, equal to the sum of "$L_1$," the distance from the melt surface to the lid 28 and "$L_i$" the distance from the lid 28 to the insulating member 29. Another solid angle $\theta$ of radiation escape, a right cone angle of between 100° and 140°, will now be made between lines drawn from the same center point on the surface of the melt tangent to the inner edges of the lid 28, between 55° and 75° of said solid cone angle impinging on the member 29 and the upper portion of the cylinder 20, heating these insulating members and causing the region they define to act as a heat conserver and afterheater zone. The vertical axis F of the crucible bisects both of the inverted, right cone angles $\phi$ and $\theta$. The apexes of both of the inverted cones lie at the same point "A" where the vertical axis of the crucible intersects a horizontal plane represented by the line $m-m$, located at distance "$L_1$" just below the lid in the crucible. The crucible is preferably filled with molten crystal constituent material to the level of the line $m-m$. To initiate the crystal growth process a seed crystal on a vertical axis is dipped into the melt surface at point "A". The crystal growth region will be initially localized around this point "A". Thermal radiation from this localized crystal growing region will thus be allowed to escape from the crucible through the unrestricted cone-shaped zone having a solid angle $\theta$ of from 100° to 140°, depending on the diameters of the lid 28 and the distance "I" between the lid and the melt surface. Radiative loss of thermal energy from other points on the melt surface, for example, from points "G" and "H", will be more restricted because of the interference to the line-of-sight escape of such radiation afforded by the lid 28. Radiative loss of heat from a point such as "G" which is outside the localized crystal growing region centered around point "A" will be restricted to a smaller angle than that of the cone-shaped zone $\theta$ and most of the radiation from point "H" will be reflected back into the melt from the lid 28.

As a result of this arrangement of the lid 28 over the surface of the melt, more heat will be removed from the localized crystal growing region around point "A" on the melt surface than will be removed from the surrounding regions of the melt surface. Since the localized region of crystal growth must be maintained at a temperature $T_L$ supporting crystal growth, more heat must be added to the melt in order to compensate for the increased loss of heat from the localized central region. These surrounding regions of the melt must thus be maintained at a higher temperature than if there were not such effective removal of heat from the localized central region, i.e., if the angle $\theta$ of the cone-shaped zone of unrestricted radiation was much below 100°. The temperature gradient from the crystal growth interface into the surrounding melt regions will therefore be increased. The resulting increased temperature gradient through the diffusion layer allows for more rapid crystal growth, i.e., an increased pulling rate, without the occurrence of constitutional supercooling.

The need to maintain the melt at a higher temperature so as to compensate for the increased loss of heat from the localized growth region requires that additional heat be supplied to the melt from the crucible walls. More electrical power must be supplied to the crucible from the coil to supply this heat. The thermal insulation surrounding the crucible must be adequate to conserve heat in the melt so that the crucible need not be maintained at an excessively high temperature with a consequent failure due to melting of the crucible. The insulating member 29 serves to restrict the heat loss from the crucible and lid 28 thus conserving heat in the zone 30 above the lid, without restricting the radiative loss of energy from the localized crystal growing region on the melt surface. The zone 30 is formed by the lid 28, insulating member 29 and cylindrical insulating member 20.

A portion of the thermal radiation escaping through the angle $\theta$ from the lid opening is interrupted by the walls of the member 20 and the annular portion of the underside of the insulating member 29. Only that portion of such radiation from point A, the apex of the two cone angles, which radiates through the angle $\phi$ of from 45° to 65° escapes through the opening in the insulating member 29. The remainder of the radiation represented by the difference between $\theta$ and $\phi$ or from about 55° to 75° of the angle $\theta$ is intercepted and conserved in the zone 30. By conserving heat from the crucible and melt in this zone 30, it is possible to maintain the high thermal gradient in the melt needed for proper crystal growth without the need to add excessive amounts of power to the crucible from the coil 27, which excessive power input could cause failure of the crucible walls by melting. At the same time, the heat conserving zone 30 acts as an afterheater or heated region over the melt whereby the crystal boule pulled from the melt is not immediately subjected to a cold environment. The member 32 further serves to restrict the loss of heat from the crystal growing apparatus.

The combined effect of the more effective cooling of the localized region of the melt surface and the additional heat inflow to the melt to compensate for such surface heat loss provides a more effective stirring of the melt whereby molten material heated to a high temperature at the sides of the crucible flows upward to the surface and then radially across the surface to the localized region of lower temperature where this flow of molten material reenters the melt and flows towards the bottom of the crucible. This stirring action is increased by cooling the bottom of the crucible through the use of larger-sized insulating chips 24, which allow the escape of more radiative energy from the crucible bottom than would occur if smaller-sized granules of insulating material were employed under the crucible. The opening 25 in the slab provides access to this chip-filled compartment allowing a further removal of heat therefrom. The more effective stirring produced according to the above arrangement provides more rapid movement of molten material across the interface of the growing crystal and serves to reduce the width of the diffusion layer and to reduce the excess concentration of solute in that layer.

An example of an apparatus suitable for producing the conditions described herein for crystal growing comprises a crucible of about 8.9 cm in height and having a circular cross section with a diameter of 6.35 cm. The lid placed over the mouth of the crucible has a central circular opening of about 3.18 cm. The annular insulating member is arranged about 3.75 cm over the lid and has a central circular opening of about 5 cm. The cone angle of cone-shaped formed by the lines running tangent to the edges of the lid opening and meeting at the center point of the melt surface will thus be about 101°, which is within the range specified, and the angle between the inner edges of member 29 and the center point of the melt surface is 52°, again within the range specified. The apex of this inverted cone will be located in the center of the crucible about 1.27 cm below the lid.

To operate the process, the crucible is provided with a melt of crystal constituent material to a level represented by the line $m—m$ in FIG. 4, which in this case is just 1.27 cm below the lid. The melt is brought to a proper temperature whereby crystal growth can occur at the localized central region and a seed crystal of a desired orientation dipped into the melt at the center of this region. The seed crystal may comprise a monocrystalline alumina rod of about 0.32 cm diameter which is supported from above by means providing for rotation and withdrawal of the rod from the melt. As crystal growth occurs on the seed crystal, it is withdrawn from the melt at a pulling rate of about 0.508 cm per hour (one-fifth inches per hour). During this phase of the process, as crystalline material builds up upon itself forming the cone-shaped section of increasing diameter, the main mechanism for loss of heat from the localized region of crystal growth will be by upward radiation from the melt through the unrestricted cone-shaped zones formed by the lid and insulating member openings, and to a lesser extent by conduction and radiation up the transparent crystal body and seed crystal. As the diameter of the crystal body increases to its maximum and the length of this body increases, more and more heat will be removed from the growing crystal body itself. As the crystal boule grows, the level of the melt will diminish, which will cause a reduction in the amount of radiative energy which can escape from the crucible through the cone-shaped zone of unrestricted access to the crucible interior formed by the lid and insulating member openings. This is so because the localized crystal growing region of the melt, now situated at a lower level in the crucible, substends a smaller value of the angle $\theta$ with the edges of the lid opening. Only a portion of the radiation from this localized region can now escape the crucible through the lid opening, the remainder of the radiation being reflected by the base of the lid back into the crucible. However, at this point of the crystal pulling operation, the boule itself has grown and has been partially pulled out of the crucible whereby considerable heat is removed from the localized region by conduction and radiation through the boule rather than by unrestricted radiation from the melt surface. Additionally, the heat input to the crucible is lowered at about this time. The critical phase of the boule growth process has now passed, i.e., the initial portion of the boule was brought out to full diameter under the high temperature gradient conditions whereby the initial portions of the boule are formed to a high order of perfection and uniformity, free of inclusions and other defects. The attainment of high perfection in the initial phase of the operation favors the production of a complete boule of the same quality.

Figure 5:
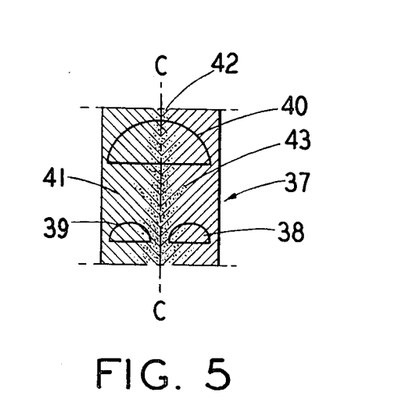
FIG. 5 is a front elevational view, partially in section, of a synthetic corundum crystal grown according to the process of this invention.
Figure 6:
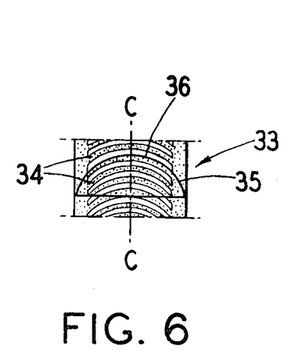
FIG. 6 is a front elevational view, partially in section, of a synthetic corundum crystal grown according to the Verneuil process.

The synthetic corundum boules produced according to the process of this invention possess characteristics enabling their fabrication into asteriated gem stones of high quality. These boules are free of the layering which characterized the Verneuil process boules. The boules produced by the process of this invention have a homogeneous color and substantially uniform distribution of asteriating compound allowing the fabrication of cabochons from any section of the boule. FIG. 5 shows a section of a boule produced according to this process and FIG. 6 represents a section of a boule grown according to the Verneuil process. The Verneuil grown boule 33 has a nonuniform, layered distribution of asteriating compound. Alternate layers 34 have titania across the full width thereof, while the rest of the layers have titania concentrated only adjacent the periphery of the boule. The fabrication of a star gem stone 35 from such a boule generally requires growing the boule with its C-axis parallel to the direction of pulling, that is, coincident with the longitudinal axis of the boule. The cabochon is generally then cut from the boule so that its convex crown 36 has approximately the same curvature as the curved layers 34. The stone so cut will have an ostensible continuous color distribution and will exhibit a star having all six rays extending equally down the sides of the cabochon. However, this need to cut the cabochon with its crown having the same curvature as the layers imposes severe limitations on the use which may be made of a boule. The boule 37 grown by the process of this invention has a substantially uniform distribution of coloring ions and asteriating compound and is free of any Verneuil type layering. The boule can be grown with any desired C-axis orientation and cabochons cut from any section of the boule as desired, provided they are oriented so that the C-axis is normal to the base of the cabochon. The boule shown in FIG. 5 has its C-axis parallel to the growth axis for comparison with the Verneuil grown boule. As seen in FIG. 5, cabochons can be cut from this boule in various sizes. For example, several smaller cabochons can be cut from one section of the boule since titania is uniformly distributed throughout the boule. Cabochons 38 and 39 represent two of four boules which could be cut from a disc-shaped section cut from the boule, with one cabochon cut from each quadrant of the disc. Larger cabochons, such as 40, could be cut as desired from other sections of the boule. By growing the boule with its C-axis at other orientations, for example with the c-axis normal to the growth axis or at an able between 0° to 90°, it would be possible to cut cabochons of increased size.

The as-grown boules produced according to this process, as well as the cabochon gem stones cut therefrom, will exhibit other characteristics which serve to distinguish them from boules grown by the Verneuil process and gem stones cut from such boules. While basically it is the absence of layers of alternate heavy and light titania concentration which distinguishes the crystals produced herein from the Verneuil grown crystals, there is another characteristic which identify the boules and gem stones of this process. Referring to FIG. 5 it is seen that the boule has faint "growth lines" 41 distributed along its longitudinal axis which are distinguishable from growth lines occurring in a Verneuil growth boule. "Growth lines" as used herein mean all optical inhomogenities which may be produced at the growth interface due to slight changes in growth rate through variations in melt temperature or pull rate due to localized changes in dopant or impurity concentrations occuring during growth because of temperature changes or changes in pull rate, as well as lattice strains or bubbles resulting from such changes in dopant or impurity concentrations, or due to changes in growth conditions. These growth lines are very faint and are shown as heavier lines in FIG. 5 for emphasis. They represent layers of varying titania and other solute content and show up as optical inhomogenities due to the difference in absorption brought about through small differences in solute concentrations. These layers are different from the layers in the Verneuil material insofar as they are not so prominent in the finished stone after asteriation as they are in layered Verneuil stones. By proper control of the crystal growing process, such growth lines can be kept to a minimum, but whatever growth lines do occur in the boules grown according to the process of this invention, they will appear as V-shaped lines. The actual changes in growth conditions causing these lines occur in the boule along the conical crystal growth interface. A longitudinal cut along the center line of the boule, as viewed in FIG. 5, will show these variations as a series of closely spaced V-shaped lines running down the longitudinal axis of the boule. A transverse cut of the boule will show these variations as a series of faint concentric circles. A slight excess concentration of solutes is found in a central core portion 42 of the boule along with some feathers 43 of heavier solute concentration extending along the growth lines. This core and feather condition is due to the more stagnant melt conditions which occur at the tip of the conical growth interface. They do not show up in the cabochons as bands or layers but merely as regions of slightly darker color. This condition can be removed by use of slightly lower withdrawal rates or changes in other growth conditions. The term "substantially uniform distribution" of titania and coloring ions, as used herein means that there is a uniform distribution of such dopants throughout the mass of the boule except for a slight excess concentration in the core region where growth lines intersect.

In the Verneuil grown boules, the growth lines are generally obscured by the heavier layers of alternately heavy and light titania content. The growth lines will however have the same curvature as the layers produced in the Verneuil boule. These growth lines are seen as curved lines when the boule is cut longitudinally through its center line, as viewed in FIG. 6, whereby the plane of the cut intersects the dome-shaped surfaces at which crystal growth occurred during the Verneuil process. A transverse cut of the Verneuil boule will show these growth lines as a series of concentric circles in the case where the boule was grown in a direction parallel to the C-axis. If the boule was grown in a direction other than the C direction, then the base will not show full concentric circles but will show portions of the conical growth surfaces which were actually exposed by the plane of cut defining the base of the cabochon.

The synthetic corundum boules grown by the process of this invention as well as the cabochons cut therefrom can be distinguished from natural asteriated corundum crystals, e.g., natural star sapphires and rubies, since the natural crystals have a different arrangement of growth lines. In a natural star sapphire or ruby, the growth planes will be generally flat surfaces, which when viewed in cross section, will have a generally hexagonal structure, reflecting the hexagonal crystal structure of corundum. The base of a natural star sapphire cabochon will exhibit a series of concentric hexagons whereas the synthetic cabochons fabricated from boules produced by the process of this invention will exhibit a series of concentric circles due to its cone-shaped growing interface.

The as-grown boule should be subjected to an asteriating heat treatment to develop the star effect. During the growth of the crystal, titanium oxides including $TiO_2$, are incorporated into the alumina lattice in solid solution. The asteriating heat treatment comprises holding the boule at a temperature, between about 1,100° C. and 1,500° C., where the solubility level of $TiO_2$ is exceeded, for a time sufficient to cause precipitation of a titanium compound, believed to be a complex aluminum titanate. In some cases, it may be desirable to subject the as-grown boule to an annealing heat treatment at a higher temperature in an oxidizing atmosphere to convert additional quantities of titanium oxides to $TiO_2$, whereby a stronger precipitate can be produced.

Synthetic asteriated corundum crystals of various colors may be produced by the process of this invention. Asteriated crystals having a white color are obtained by adding only titania to the alumina melt in amounts of from about 1 to about 3 percent by weight. Asteriated blue sapphires are obtained from boules grown from melts containing from about 1 to about 3 percent by weight titania and to which has been added from about 0.9 to about 1.5 percent by weight ferric oxide. Asteriated red rubies are obtained from boules grown from melts containing, in addition to the indicated amounts of titania an amount of chromium oxide ($Cr_2O_3$) up to about 0.5 percent by weight, depending on the intensity of the red color desired. The black star sapphires are obtained from boules grown from melts containing, in addition to the indicated amounts of titania, an amount of vanadium oxide ($V_2O_3$) from about 1 to about 1.5 percent by weight. Synthetic asteriated corundum crystals of other colors can be obtained from boules grown so as to contain those dopant ions which produced a given desired color in the crystal. Compounds of these dopant ions are added to the melt from which the boule is grown together with titania in the amounts indicated to give the asteriation effect.

WHAT IS CLAIMED IS:

1. A process for producing a synthetic corundum crystal wherein a titanium asteriating compound is uniformly distributed throughout the crystal, comprising establishing a melt composed of alumina and titania, the titania being present in an amount from about 1% to about 3% by weight of said melt, establishing a region on the surface of said melt at a temperature suitable for crystal growth, dipping a seed crystal into the melt, and pulling the seed crystal from the melt as crystal growth occurs thereon.

2. The process of claim 1 wherein the effective distribution coefficient of titania solute in the melt and the crystal grown therefrom is 0.1 whereby a rejection of said titania solute from the growing crystal occurs with a resultant increase in concentration of titania solute in a narrow diffusion layer of the melt adjacent the crystal interface, said excess titania concentration being transportable through said layer into the melt proper only by a time dependent diffusion mechanism and thereby dictating a maximum pulling rate for withdrawing the crystal from the melt without the incorporation into the growing crystal of portions of the melt containing excess concentrations of titania solute, comprising dipping a seed crystal into a localized region of the surface of said melt and initiating crystal growth thereon, and withdrawing said growing crystal from the melt at a pulling rate in excess of the maximum pulling rate dictated by the excess titania concentration at the growth interface, and preventing the incorporating into the growing crystal of excess solute containing portions of the melt by maintaining the localized region at a temperature supporting crystal growth while restricting the loss of heat by radiation from regions of the melt surrounding the localized region to maintain a higher temperature gradient through the diffusion layer into the melt proper than the temperature gradient which would normally occur if such loss of heat from the surrounding regions were not restricted, whereby portions of the liquid containing excess solute are not trapped and solidified in the growing crystal because of the higher temperature in the diffusion layer.

3. The process of claim 1 wherein compounds of coloring elements are present in the melt.

4. A process for producing a synthetic corundum crystal wherein a titanium asteriating compound is uniformly distributed throughout the crystal, comprising establishing a melt composed of alumina and titania, the titania being present in an amount from about 1 to about 3 percent by weight of the melt, establishing a localized region on the surface of said melt at a temperature suitable for crystal growth while maintaining regions immediately surrounding said localized region at a temperature not supporting crystal growth by heating said melt while allowing unrestricted upward radiation of thermal energy from the localized region while restricting the loss of heat by radiation from the surrounding regions, dipping a seed crystal into the melt in the localized region, and pulling the seed crystal vertically from the melt as crystal growth occurs thereon forming a cone-shaped crystal body of gradually increasing diameter, and continuing the withdrawn of heat from said localized region mainly by substantially unrestricted radiation from said region and to a lesser extent by conduction and radiation upward through the cone-shaped crystal body until the diameter of the body reaches a desired diameter and, thereafter, continuing to pull the crystal body of desired diameter from the melt while withdrawing heat from the localized region mainly by conduction and radiation through the crystal body.

5. The process of claim 4 in which the melt substantially contains from about 0.9 to about 1.5 percent by weight ferric oxide.

6. The process of claim 4 in which the melt additionally contains from about 1 to about 1.5 percent vanadium oxide.

7. The process of claim 4 in which the melt additionally contains chromium oxide in an amount up to about 0.5 percent by weight.

* * * * *